INVENTOR
FRITZ HENNIG
BY Stier & Stier
ATTORNEYS

April 29, 1969 F. HENNIG 3,441,671

SWITCHING ARRANGEMENT FOR CODING AND CONVERTING INFORMATION SIGNALS

Filed Sept. 16, 1965 Sheet 2 of 4

INVENTOR
FRITZ HENNIG
BY Spiel & Spiel
ATTORNEYS

April 29, 1969 F. HENNIG 3,441,671
SWITCHING ARRANGEMENT FOR CODING AND
CONVERTING INFORMATION SIGNALS
Filed Sept. 16, 1965

INVENTOR
FRITZ HENNIG
BY
ATTORNEYS

INVENTOR
FRITZ HENNIG

BY [signature]

ATTORNEYS

United States Patent Office 3,441,671
Patented Apr. 29, 1969

3,441,671

SWITCHING ARRANGEMENT FOR CODING AND CONVERTING INFORMATION SIGNALS

Fritz Hennig, Munich-Solln, Germany, assignor to Siemens Aktiengesellschaft, a corporation of Germany Filed Sept. 16, 1965, Ser. No. 487,804
Claims priority, application Germany, Sept. 15, 1964, S 93,151
Int. Cl. H04l 15/18, 15/12, 15/24
U.S. Cl. 178—17 6 Claims

ABSTRACT OF THE DISCLOSURE

A switching arrangement for use in teletypewriter or data writing machines which allows a shift key to make a selection between two symbols allocated to a common key so that a substantial saving in the number of keys may be made. A plurality of storage lines corresponding to the number of symbols to be coded are coupled over windings to ring cores and are connected to switches each actuatable by a key and are connected to one of several distributor lines. Change switches are suitably actuatable through a shifting mechanism to allow a saving in the total number of keys and elements in the switching system.

The invention relates to a switching arrangement in teletypewriter or data processing machines for coding and converting signals, utilizing a magnetic core switching arrangement.

In particular, the invention relates to a switching arrangement in teletypewriter or data writing machines such as are used as the input device in data processing machines, for the coding of signals which are fed in over keys, each occupied with one or more symbols of a keyboard, utilizing a magnetic core switching arrangement.

The large number of symbols to be printed, among other reasons, presents the problem, especially in connection with a new eight-step code, of effecting a double occupation of the symbol keys for simplification of operation. Here it is sought to have the key field correspond to that of a typewriter, whereby readjustment difficulties for the operating personnel in the case of alternative utilization of both types of machines can be avoided. The shift of the upper symbol on the key should take place, as in office machines, by simultaneous actuation of a shift key.

The differences between the national specifications relating to symbol distribution of the keys of the typewriter keyboard and an international telegraph alphabet, leads, in the use of the latter, to the result that the code symbols of two symbols allocated to a key in common may arbitrarily deviate from one another in any number of code steps. Further, in certain cases, it may be desired to use at will, with single occupation of the keys, two different codes.

There has been proposed a mechanical device for the coding of symbols fed in over keys occupied with one or more symbols of a keyboard, in which on the selecting slides there is arranged a number of selector stud rows corresponding to the number of symbols for the allocated keys, and on the selector members, controlled by one or more shift keys shiftable teeth may be disposed in the range of one of such selector stud rows. This mechanical device is far superior in its range of application and in its manner of operation to known devices, in which a shift key merely reverses the polarity of a certain code step.

In the electronic field, switching arrangements for the coding of symbols have become known, which are fed in over keys occupied with a symbol of a keyboard, making use of magnetic core switching arrangements. Keyboards with an electronic coding device have the advantage over mechanical arrangements in that only an electrical contact has to be actuated by the keys, so that the actuating forces to be exerted by operating personnel are very slight as compared to the forces required in keyboards with a mechanical coding system.

The problem of the invention is the development of an electronic coding device with which it is possible, through operation of a shift key, to make a selection between two symbols allocated to a common key, which differ from one another, with respect to the code symbol to be emitted, in any arbitrary combination of code steps.

A further development of the switching arrangement according to the invention for use in teletypewriter or data writing machines, such as are used as the input in data processing machines, for the coding of symbols which are inserted or fed in over keys, each occupied with one or more symbols of a keyboard, is characterized by the feature that a plurality of storage lines, corresponding in number to the number of symbols to be coded, according to the possibilities of one or several code alphabets, are coupled over windings with ring cores, and are connected, on the one hand, switches respectively allocated thereto, each actuatable by a key, and, on the other hand, are connected to one of several distributor lines, the number of which corresponds to the number of occupation states of the keys of the keyboard with symbols, whereby the storage input lines allocated to only one symbol are rendered operative directly over the distributor line therefor, and the storage input lines allocated to switching elements selectively occupied by several symbols are rendered operative over the distributor line therefor, as determined by change switches actuatable through a shifting mechanism.

The switching arrangement according to the invention, is very simple in its construction, and achieves a trouble-free operation. The symbol entered through one of the storage lines and stored in coded form in the magnetic cores thereof can be read out either in parallel or in series form.

In order to simplify the production of the magnetic core system, according to a further development of the switching arrangement embodying the invention, in the use of a code in which the code combination symbols allocated to a common key differ only in a small number of definite code steps, a common storage line for the code combination symbols allocated to a common switch is coupled with the corresponding magnetic cores of the steps which are common to the respective symbols.

To prevent the formation of undesired circuits over the distributor lines it may be necessary to insert a directional conductor in series with each storage line. To further reduce the number of such directional conductors, and thus the production expenditure of the magnetic core system, in another preferred form of switching arrangement according to the invention, the storage lines are separately arranged as to steps which differ from one another in the respective code combinations, and are connected in parallel to common switches associated with the corresponding distributor line, and thus coupled in common with the corresponding magnetic cores.

Details of the invention are described in the following with the aid of embodiments illustrated in the drawings, in which.

Figure 1:
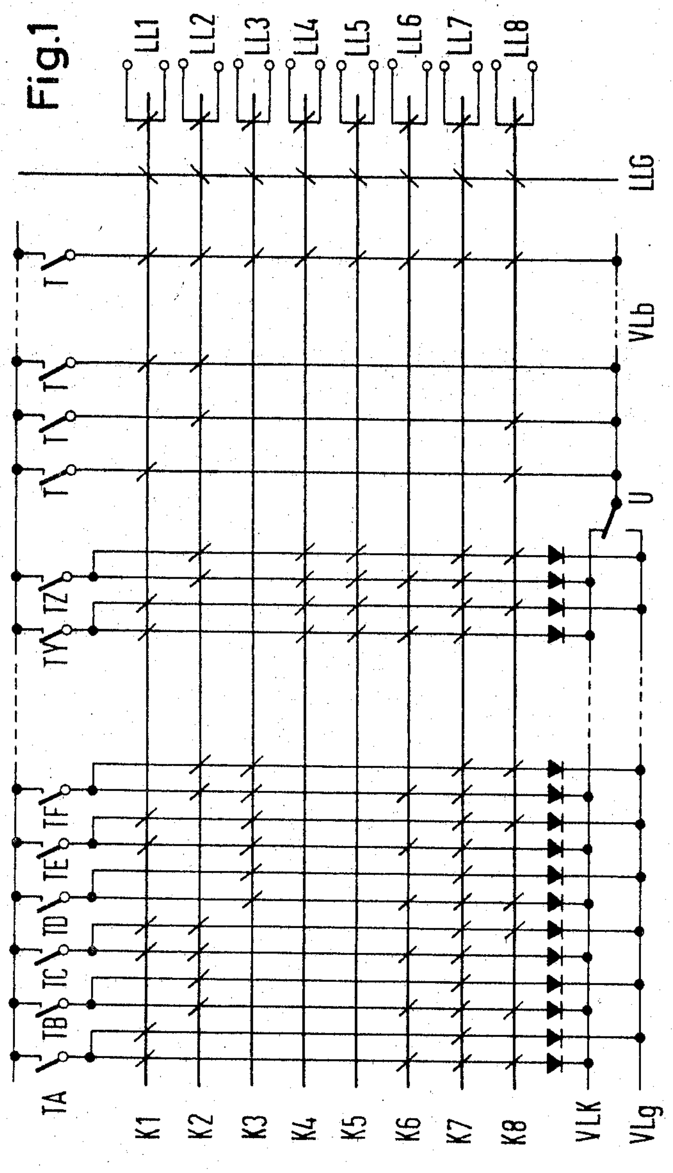
FIGURE 1 illustrates a switching arrangement for a keyboard in which, on the one hand, keys are arranged which are occupied only with one symbol each, and, on the other hand, keys are arranged which are occupied with two symbols, in which selection therebetween is effected by simultaneous actuation of a shift key and the selected symbol key.
Figure 3:
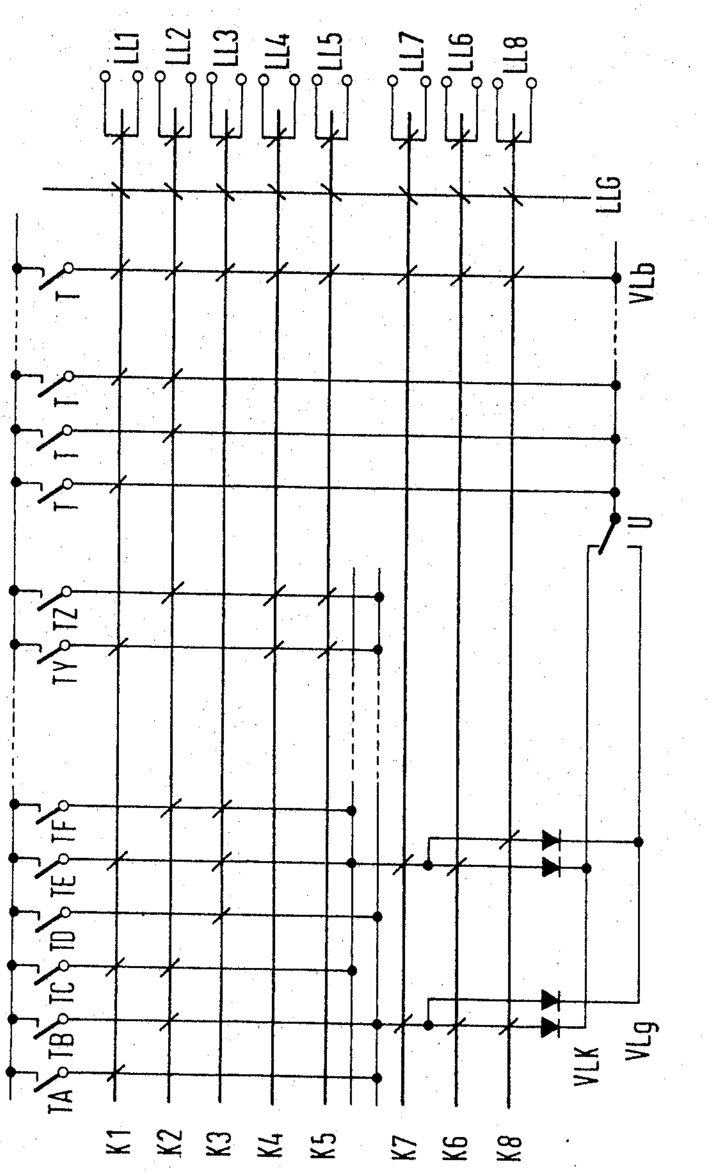
Figure 4:
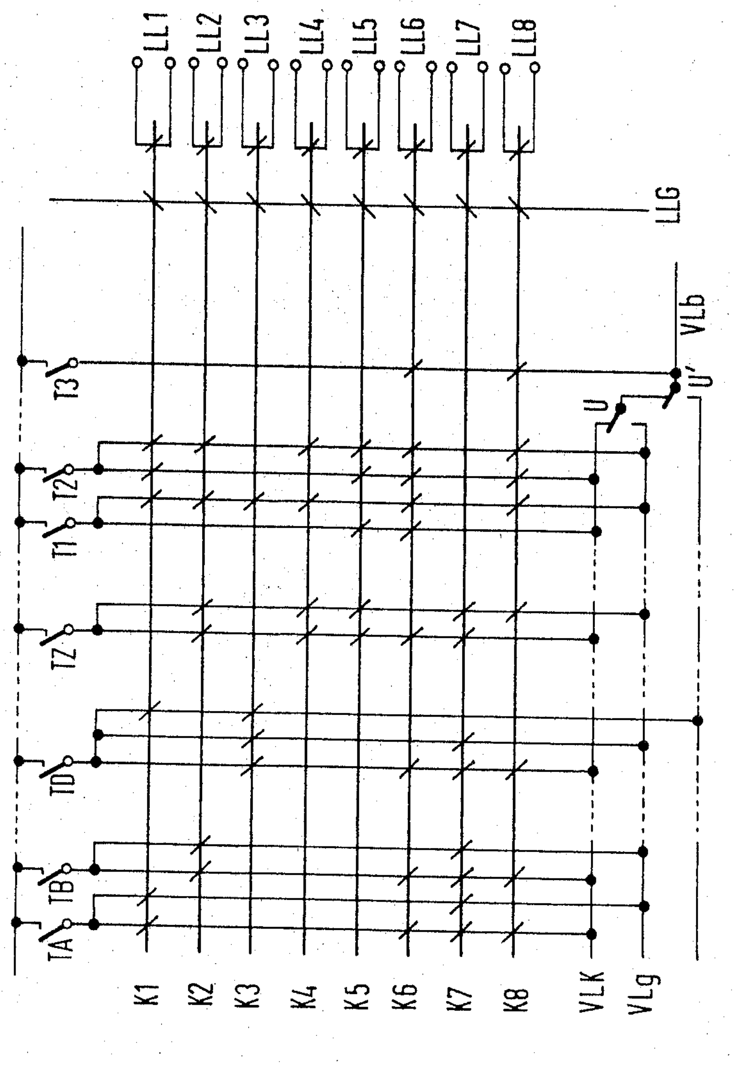

FIGURE 3 illustrates a switching arrangement likewise corresponding to the circuit of FIGURE 1, in which the code combinations of the common switches, involving code steps differing from one another, are coupled in common, over a distributor line, with the corresponding magnetic cores, allocated to such distributor line; and FIGURE 4 illustrates a switching arrangement with two shift keys, and symbols allocated to a common key contact, which differ from one another, with respect to the code combinations, in any arbitrary arrangement of the code steps.

Referring to FIGURE 1, reference symbols TA, TB, TC . . . TY and TZ designate switch contacts which are allocated to keys occupied with the symbols *a*–A, *b*–B, *c*–C, . . . *y*–Y and *z*–Z, while reference symbol T designates switch contacts which are allocated to keys occupied with only one symbol, especially command signals, for example "Carriage Return" or "line advance." Utilizing an eight-step code according to an ISO proposal, entering storage lines allocated to the switch contacts TA . . . TZ, T are coupled according to the corresponding code combination steps with magnetic cores K1, K2 . . . K8. The free ends of the storage lines allocated to switch contacts T are connected to a distributor line VL*b*, while the free ends of the storage lines allocated to the switch contacts TA, TB . . . TZ are selectively connected, for small letters to the distributor line VL*k*, and for capital letters to the distributor line VL*g*. The distributor line VL*b* is constantly electrically connected, over the feed line for the switch contacts TA . . . TZ, T, to a current source, while the distributor lines VL*k* and VL*g*, according to the position of a shift contact U, are selectively connectible, as desired to feed line for such to the current source. The shift contact U, in the position illustrated in the drawing, is in rest position and connects the distributor line VL*k*, allocated to the small letters, with the current source.

When a switch contact T is actuated, there is stored into the magnetic cores K1, K2 . . . K8 a code combination allocated to the corresponding symbol. If one of the switch contacts TA, TB . . . TZ is then actuated, depending on the position of the shift key U, the code combination for the small or for the capital letters allocated to this switch contact is stored into the magnetic cores K1, K2 . . . K8.

The evaluation of the stored code combination can take place in two different ways. If a reading pulse is applied to the reading line LLG, common to all the magnetic cores, the evaluating impulses can then be scanned in parallel on the reading lines LL1, LL2 . . . LL8. If, on the other hand, the reading pulses are successively supplied over a timing distributor to the reading lines LL1, LL2 . . . LL8, the code combination pulses are there successively emitted through the common reading line LLG.

Figure 2:
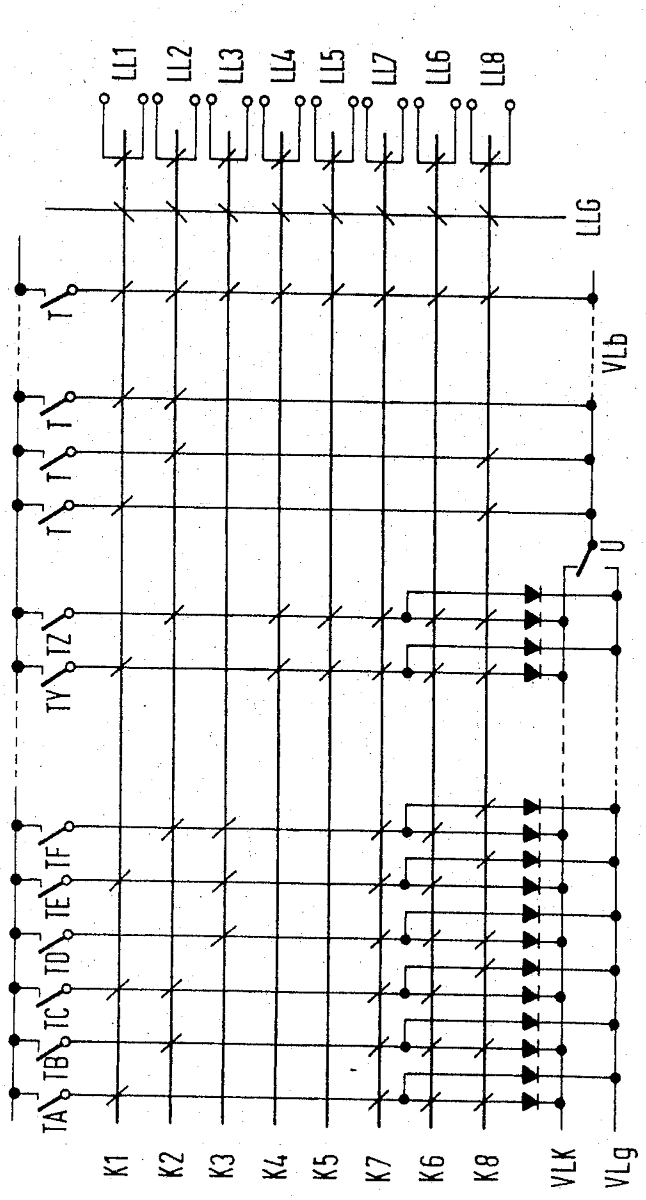
FIGURE 2 illustrates switching arrangement corresponding to the circuit of FIGURE 1, in which, however, like code steps of code combination symbols allocated to a common switch are provided with a common storage line which is coupled with the corresponding magnetic cores.

The switching arrangements illustrated in FIGS. 2 and 3 involves constructions employing simplified switching techniques. If, in the switching arrangement according to FIG. 1, a total of 224 couplings between the storage lines and the magnetic cores are employed and, additionally, 52 directional conductors are necessary for the storing of the letter symbols, in the arrangement according to FIGURE 2 the number of couplings is reduced to 138, and in the arrangement according to FIGURE 3 to 66. The number of directional conductors in the arrangement according to FIGURE 3 is reduced down to only four.

FIGURE 4 illustrates a switching arrangement in which key contacts are arranged whose allocated input lines may be selectively coupled, as desired, with any combination of magnetic cores. The key contact T1 is allocated according to the code alphabet of the ISO proposal mentioned, to the input of the symbol "0" in rest position of the shift contact U. For the symbol "0" the input line is coupled with the magnetic cores K5, K6 and for the symbol "/" the other input line is coupled with the magnetic cores K1, K2, K3, K4, K6, K8. Likewise, the input lines of the key contact T2, which are allocated to the symbols "1" and ";" are coupled with a different combination of magnetic cores. The allocation, in each case, of the symbols to a common key corresponds to the key arrangement in office typewriters. To the key contact TD there may be allocated, in addition to the input lines for the letter *d* and for the letter D, an input line for the sign "who's there?", which is rendered operative over a separate distributor line and a shift contact U'.

The switching arrangement according to the invention for the shifting from one symbol group to another, by means of a shift key, as the variations in the switching arrangements herein illustrated, are from a viewpoint of circuit technology, modifiable in many ways. For example, instead of one set of magnetic cores, several parallel-arranged sets of magnetic cores can be utilized, without affecting the manner of operation of the switching arrangement according to the invention.

I claim as my invention:

1. A switching arrangement for teletypewriter or data processing machines for the coding and conversion of symbols, employing a magnetic core switching arrangement, characterized by the feature that a plurality of storage input lines, corresponding in number to the number of symbols involved, and which are coupled, according to the requirements of at least one code alphabet, over windings with associated magnetic cores, are operatively connected to the switching elements allocated thereto, and to one of several distributor lines, corresponding in number to the number of occupation states of the switching elements pertaining to information symbols, in which system the storage input lines allocated to switching elements occupied by only one symbol are operatively connected directly over the distributor line therefor, and a change switch, the storage input lines allocated to switching elements selectively occupied by several symbols being operatively connected over a distributor line therefor, as determined by said change switch, said switch being actuatable through a shifting mechanism.

2. A switching arrangement according to claim 1, in teletypewriter or data processing machines such as are used for the input in data processing machines, for the coding of symbols which are entered over said switching elements by means of keys associated therewith, each of which is occupied with one or several symbols of a keyboard, wherein a plurality of storage lines, corresponding to the number of symbols to be coded, are coupled, according to one or several code alphabets, over windings to ring cores, said lines being connected to the respective switch contacts allocated thereto, operable by respective keys, and to one of several distributor lines, the number of which corresponds to the number of occupation states of the symbol keys of the keyboard, in which system the storage lines allocated to keys occupied with only one symbol are operatively connected over a distributor line therefor, and the storage lines allocated to keys occupied with several symbols are operatively connected over selected distributor lines as determined by said change switch actuatable by a shift key.

3. A switching arrangement according to claim 1, utilizing a code having code combination symbols differing only in a small number of definite code steps, wherein a common storage line is arranged with the corresponding magnetic cores for like steps of the code combination symbols allocated to a common switch contact.

4. A switching arrangement according to claim 3, wherein the respective storage lines, for steps of such code combination symbols which are different, are connected to said common storage line and by respective directional conductors to corresponding distributor lines.

5. A switching arrangement according to claim 1, utilizing a code having code combinations, allocated to a common switch contact, which differs only in a small number of definite code steps, wherein separate storage lines are provided for the different code steps of the two symbols allocated to a common switch contact, and such lines are connected in common with respective distributor lines associated with magnetic cores of steps which are common to the respective symbols.

6. A switching arrangement according to claim 5, wherein the respective lines for the code steps which are common to a plurality of storage lines having different code steps, are connected through respective directional conductors.

References Cited

UNITED STATES PATENTS

| | | | |
|---|---|---|---|
| 2,708,267 | 5/1955 | Weidenhammer | 340—166 |
| 3,065,298 | 11/1962 | Saykay | 178—79 |
| 3,208,046 | 9/1965 | Young | 340—166 |

THOMAS A. ROBINSON, *Primary Examiner.*

U.S. Cl. X.R.

340—166, 174; 178—26, 79